United States Patent Office 3,778,411
Patented Dec. 11, 1973

3,778,411
POLYAMIDE ACIDS AND POLYAMIDEIMIDES
Carl M. Emerick, Ballston Spa, and Denis R. Pauze, Scotia, N.Y., assignors to General Electric Company
No Drawing. Filed July 30, 1971, Ser. No. 167,837
Int. Cl. C08g 20/32
U.S. Cl. 260—65    7 Claims

ABSTRACT OF THE DISCLOSURE

New and useful polyamideimides and their precursor polyamic acids are provided. The polyamic acid is prepared by reacting diacid with polyamine material including polymethylene polyaniline and further reacting this reaction product with organic dianhydride and aliphatically unsaturated organic anhydride. The polyamic acid is cured to provide the final polyamideimide.

---

This invention relates to new and useful polyamideimides and their precursor polyamic acids. More particularly, the invention relates to polyamic acids which are prepared by reacting diacid with polyamine material including polymethylene dianiline and further reacting this reaction product with organic dianhydride and aliphatically unsaturated organic anhydride, the polyamideimide being obtained by curing the polyamic acid.

The use of polyamideimides as high temperature-resistant coating and electrical insulating materials is well known, such compositions being shown, for example, in U.S. Pats. 3,179,635; 3,471,444; 3,554,984; 3,555,113; 3,562,217 and 3,576,691, among others. However, despite the availability of such materials, there has continued a search for polyamideimides and their precursor polyamic acids which can be easily prepared in economical and readily available solvent systems, the polyamic acid compositions being capable of simple and efficient application to substrates and the cured product possessed of good and lasting flexibility, improved cut-through, good abrasion resistance, good dissipation factor, resistance to heat shock and the ability to withstand thermal aging and exposure to halogenated hydrocarbons such as those used in hermetic applications without appreciable deterioration of electrical or other physical qualities.

It is a primary object of this invention to provide new and improved polyamic acids and polyamideimides which accomplish the above goals. According to the present invention, the polyamic acid is prepared by reacting in a relatively inexpensive solvent diacid and polyamine material, the latter including polymethylene polyaniline. This reaction product is then reacted with organic anhydride and aliphatically unsaturated organic anhydride in mixture to provide polyamic acid which is cured in usual manner to the final polyamideimide resin state.

Those features of the invention which are believed to be novel are set forth with particularity in the claims appended hereto. The invention will, however, be better understood from a consideration of the following detailed description.

As pointed out above, a drawback of many of the prior art materials of this general type has been that they require the use of relatively expensive solvents such as N-methylpyrrolidone, dimethylacetamide, pyridine, n-methylcaprolactam, dimethyl sulfoxide, and the like. While the present reactions can be carried out using such solvents, it is one of the advantages of the present invention that relatively inexpensive solvents can be used. For example, cresylic acids which are generally a mixture of ortho-, meta- and para-cresol can be used as can such other materials such as cyclohexanone, acetophenone, and the like, among others which will occur to those skilled in the art. Also useful in connection with the present invention are what are so-called high boiling hydrocarbon solvents, such materials including, among others, Solvesso 100 which is a mixture of mono-, di- and trialkyl (primarily methyl) benzenes having a flash point of about 113° F. and a distillation range of from about 318° F. to 352° F., such solvent being made by the Humble Oil Company. Another solvent useful in the present connection is Humble 670 solvent, a mixture of mono-, di- and trialkyl (primarily methyl) benzenes having a gravity API 60° F. of 31.6 percent, a specific gravity at 60° F. of 0.8676, a mixed aniline point of 11° F. and a distillation range of about 288° F. to 346° F.

The diacids useful in the present connection can be expressed by the formula (I)            HOOC—R—COOH where R is an unsaturated or saturated substituted or unsubstituted aliphatic group containing from about 1 to 40 carbon atoms. Among such diacids are oxalic, maleic, succinic, glutaric, adipic, pimelic, suberic, azelaic, sebacic and dodecanedioic acids, as well as unsaturated acids falling within the above formula including maleic and fumaric acids, among others. Mixtures can, of course, be used. A dibasic acid having a chain thirty-six carbons long is Emery Industries, Inc. 3712-R Dimer Acid. Others will occur to those skilled in the art.

Up to about 50, preferably up to about 30, equivalent percent of the aliphatic diacid can be substituted with aromatic diacids, typical of which are terephthalic and isophthalic acids as well as aromatic anhydrides. Aliphatic anhydrides are also useful in this respect such as those based on the above diacids, among others. Also useful in such substitution are tricarboxylic acid anhydride materials which can be expressed by the following formula (II) 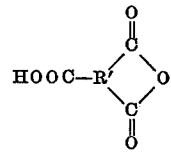

where R' is a trivalent organic radical. Among such materials which will occur to those skilled in the art are trimellitic anhydride;
2,6,7-naphthalene tricarboxylic anhydride;
3,3',4-diphenyl tricarboxylic anhydride;
3,3',4-benzophenone tricarboxylic anhydride;
1,3,4-cyclopentane tetracarboxylic anhydride;
2,2',3-diphenyl tricarboxylic anhydride;
diphenyl sulfone-3,3',4-tricarboxylic anhydride;
diphenyl isopropylidene-3,3',4-tricarboxylic anhydride;
3,4,10-propylene tricarboxylic anhydride;
3,4-dicarboxyphenyl-3-carboxyphenyl ether anhydride;
ethylene tricarboxylic anhydride;
1,2,5-naphthalene tricarboxylic anhydride;

etc. Also useful are the corresponding acids of such anhydrides. Where diacids are mentioned, such substitutions will be understood to be included.

The polyamines useful in connection with the present invention are well known and can be expressed by the formula (III)            X—R''—(NH$_2$)$_n$ where R'' is an organic radical and $n$ is at least 2 and X is hydrogen, an amino group or substituted or unsubstituted organic group including those also containing at least one amino group. The specific amines useful for the present invention, alone or in admixture, include but are not limited to the following:

p-xylylene diamine
bis(4-amino-cyclohexyl)methane
hexamethylene diamine
heptamethylene diamine
octamethylene diamine
nonamethylene diamine
decamethylene diamine
3-methyl-heptamethylene diamine
4,4'-dimethylheptamethylene diamine
2,11-diamino-dodecane
1,2-bis-(3-amino-propoxy)ethane
2,2-dimethyl propylene diamine
3-methoxy-hexamethylene diamine
2,5-dimethylhexamethylene diamine
2,5-dimethylheptamethylene diamine
5-methylnonamethylene diamine
1,4-diamino-cyclo-hexane
1,12-diamino-octadecane
2,5-diamino-1,3,4-oxadiazole
$H_2N(CH_2)_3O(CH_2)_2O(CH_2)_3NH_2$
$H_2N(CH_2)_3S(CH_2)_3NH_2$
$H_2N(CH_2)_3N(CH_3)(CH_2)_3NH_2$
meta-phenylene diamine
para-phenylene diamine
4,4'-diamino-diphenyl propane
4,4'-diamino-diphenyl methane
benzidine
4,4'-diamino-diphenyl sulfide
4,4'-diamino-diphenyl sulfone
3,3'-diamino-diphenyl sulfone
4,4'-diamino-diphenyl ether
2,6-diamino-pyridine
bis(4-amino-phenyl)diethyl silane
bis(4-amino-phenyl)diphenyl silane
bis(4-amino-phenyl)phosphine oxide
4,4'-diaminobenzophenone
bis(4-amino-phenyl)-N-methylamine
bis(4-aminobutyl)tetramethyldisiloxane
1,5-diaminonaphthalene
3,3'-dimethyl-4,4'-diamino-biphenyl
3,3'-dimethoxybenzidine
2,4-bis(beta-amino-t-butyl)toluene
toluene diamine
bis(para-beta-amino-t-butyl-phenyl)ether
para-bis(2-methyl-4-amino-pentyl)benzene
para-bis(1,1-dimethyl-5-amino-pentyl)benzene
m-xylylene diamine
polymethylene polyaniline of formula (iv)

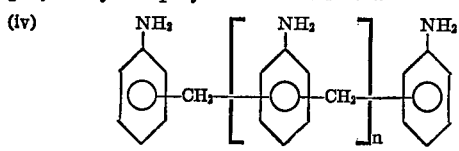

where n is from about 0.1 to 10, preferably 0.3.

It should be noted that while mixtures of such polyamines can be used, it has been found that polymethylene polyaniline is a necessary constituent of the present materials and preferably in an amount of at least 10 equivalent percent based on the total amine content.

Dianhydrides expressed by the formula (V)

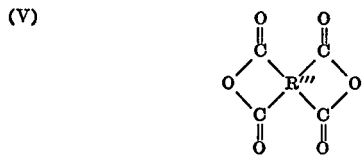

where R''' is a tetravalent radical containing at least two carbon atoms selected from substituted and unsubstituted aliphatic, cycloaliphatic, heterocyclic, aromatic groups and combinations thereof which can be utilized alone or in admixture as a constituent of the anhydride mixture to be reacted with the diacid-polyamine reaction product include but are not limited to pyromellitic dianhydride
2,3,6,7-naphthalene tetracarboxylic dianhydride
3,3',4,4'-diphenyl tetracarboxylic dianhydride
1,2,5,6-naphthalene tetracarboxylic dianhydride
2,2',3,3'diphenyl tetracarboxylic dianhydride
2,2-bis(3,4-dicarboxyphenyl)propane dianhydride
bis(3,4-dicarboxyphenyl)sulfone dianhydride
3,4,9,10-perpylene tetracarboxylic dianhydride
bis(3,4-dicarboxyphenyl)ether dianhydride
ethylene tetracarboxylic dianhydride
naphthalene-1,2,4,5-tetracarboxylic dianhydride
naphthalene-1,4,5,8-tetracarboxylic dianhydride
decahydronaphthalene-1,4,5,8-tetracarboxylic dianhydride
4,8-dimethyl-1,2,3,5,6,7-hexahydronaphthalene-1,2,5,6-tetracarboxylic dianhydride
2,6-dichloronaphthalene-1,4,5,8-tetracarboxylic dianhydride
2,7-dichloronaphthalene-1,4,5,8-tetracarboxylic dianhydride
2,3,6,7-tetrachloronaphthalene-1,4,5,8-tetra-carboxylic dianhydride
phenanthrene-1,8,9,10-tetracarboxylic dianhydride
cyclopentane-1,2,3,4-tetracarboxylic dianhydride
pyrrolidine-2,3,4,5-tetracarboxylic dianhydride
pyrazine-2,3,5,6-tetracarboxylic dianhydride
2,2-bis(2,3-dicarboxyphenyl)propane dianhydride
1,1-bis(2,3-dicarboxyphenyl)ethane dianhydride
1,1-bis(3,4-carboxyphenyl)ethane dianhydride
bis(2,3-dicarboxyphenyl)methane dianhydride
bis(3,4-dicarboxyphenyl)methane dianhydride
bis(3,4-dicarboxyphenyl)sulfone dianhydride
benzene-1,2,3,4-tetracarboxylic dianhydride
1,2,3,4-butane tetracarboxylic dianhydride
thiophene-2,3,4,5-tetracarboxylic dianhydride
3,3',4,4'-diphenyltetracarboxylic dianhydride
3,4,3',4'-benzophenone tetracarboxylic dianhydride
azobenzene tetracarboxylic dianhydride
2,3,4,5-tetrahydrofuran dianhydride
p-phenylenebis(trimellitate)anhydride
1,2-ethylenebis(trimellitate)anhydride
2,2-propanebis(p-phenylene trimellitate) anhydride
4,4'-[p-phenylenebis(phenylimino)carbonyl diphthalic] anhydride
4,4'-diphenylmethanebis(trimellitamide) anhydride and mixtures thereof.

The aliphatically unsaturated organic anhydrides useful in the present respect can be expressed by the formula (VI)

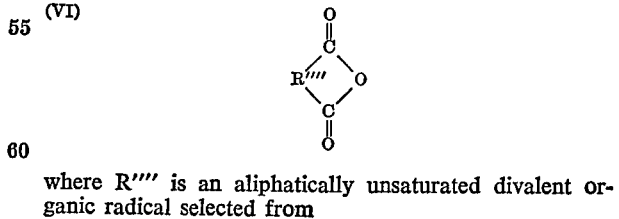

where R'''' is an aliphatically unsaturated divalent organic radical selected from (VII)

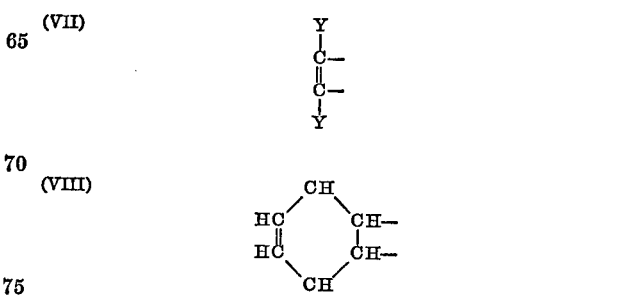

(VIII)

(IX)

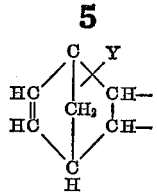

where Y is a radical selected from hydrogen, lower alkyl, halogen, or mixtures thereof, such as chloromethyl, ethyl, propyl, bromo, and the like.

The relative proportions of constituents to be reacted can vary. For example, for each equivalent of diacid there is preferably reacted a total of two equivalents of polyamine material including, as pointed out above in each instance, at least some polymethylene polyaniline, which can vary from about one-tenth equivalent to two equivalents, in the latter case being the total amount of polyamine. The ratio of polyamine material to diacid can also be varied to three equivalents to two equivalents respectively or even lower. There is reacted with the diacid-polyamine reaction product one equivalent of anhydride material including always at least some aliphatically unsaturated anhydride depending upon the specific characteristics of the final product desired.

The following examples illustrate the practice of the invention.

EXAMPLE 1

There were heated together 312.8 parts methylene dianiline, 16.48 parts polymethylene polyaniline of Formula IV where $n$ is equal to about 0.3 (Curithane 103), 152 parts azelaic acid, 52 parts cresylic acid and 40 parts Solvesso 100 to a temperature of 250° C. under nitrogen, during which time about 99 percent water of condensation was collected. The temperature was maintained at 250° C. for one hour and the resultant prepolymer polyamine diluted and cooled with 2580 parts cresylic acid. When cooled, there was added to the solution 660 parts of Solvesso 100. Next, there were added to the solution 221 parts benzophenone tetracarboxylic acid dianhydride (BTDA), the mixture being stirred for two hours under nitrogen. To 1142 parts of the above solution, 6.84 parts of BTDA were added with stirring and after 1½ hours 4.1 parts of maleic anhydride were added. The viscosity after standing for about 12 hours was about 2200 centipoises (cps.) at 25° C. A coating of the material cured for one-half hour at 200° C. provided a tough, flexible film. When a 2.4 mil coating of the solution was applied to a 0.0403" diameter copper wire and the coating cured in a tower at 200° C. to 400° C., tested in accordance with the procedures set forth in U.S. Pat. 2,936,296, the flexibility under the 25 percent elongation test was 1×, the surface was continuous and smooth without blemish, the sudden snap test was satisfactory, and the cut-through was 342° C.

EXAMPLE 2

A flask was charged as in Example 1 with 12.9 parts Curithane 103, 59 parts azelaic acid, 112 parts methylene dianiline, 6.5 parts cresylic acid and 10.0 parts Solvesso 100 for an azeotrope. This was heated to 250° C. and the temperature maintained for one hour with the theoretical water collected. The solution was then cut with 600 parts cresylic acid and 152.0 parts of Humble 670.

The room temperature solution was then charged with 75.7 parts of BTDA and 15.3 parts of maleic anhydride. The solution was heated to 70° C. and stirred for one hour, cooled and filtered. A film prepared by placing one part in aluminum cup in a 200° C. oven for 20 minutes was clear and flexible.

EXAMPLE 3

A resin was prepared the same as in Example 1 except 152.0 parts of acetophenone were used instead of Humble 670. A film prepared in the same manner as above was clear and flexible.

EXAMPLE 4

A resin was prepared the same as in Example 1 except 152.0 parts of cyclohexanone were used in place of Humble 670. A film prepared in the same manner as above was clear and flexible.

EXAMPLE 5

A flask under nitrogen was charged with 412.0 parts Curithane 103, 188.0 parts azelaic acid, 24.0 parts cresylic acid and 40.0 parts Solvesso 100. The contents were heated to 250° C. and that temperature maintained for one hour with the theoretical amount of water being collected. To this 1000 parts of N-methylpyrrolidone were added, the solution cooled to room temperature and 196.0 parts of maleic anhydride added. The prepolymer solution was precipitated by addition into water, washed with methanol, then dried in vacuo for two hours at 93° C. A film prepared by dissolving a small portion of the above into N-methylpyrrolidone and curing for one hour at 200° C. was clear and pliable.

EXAMPLE 6

There were mixed together in the manner of Example 1 444.4 parts methylene dianiline, 51.2 parts Curithane 103 (Formula IV where $n=0.3$), 234.4 parts azelaic acid, 40 parts Solvesso 100 and 100 parts of cresylic acid, the mixture being heated to 250° C. with the temperature maintained for one hour with the theoretical amount of water being collected. The solution was then diluted with 2290 parts cresylic acid and 590 parts Solvesso 100. The room temperature solution was then divided into four fractions of 865 parts each. To part A there were added 59.7 parts 1,2,3,4-butanetetracarboxylic dianhydride (TCBA). To part B there were added 15.4 parts TCBA, 48.2 parts BTDA and 15.4 parts maleic anhydride. To part C there were added 30.9 parts TCBA, 23.1 parts BTDA, and 15.4 parts maleic anhydride, and to part D there were added 44.3 parts TCBA, and 15.4 parts maleic anhydride. The contents of each of the portions A through D were heated to 70° C. until solution occurred, cooled to room temperature, filtered and applied to copper wire having a diameter of 0.0403". When tested as above, the flexibility of wires A, B and C was 25%+2× and that of D was 25%+1×. The cut-throughs were respectively 270° C., 355° C., about 325° C., and about 340° C. The respective dielectric strengths in kilovolts per mil were 10.5, 9.1, 9.9 and 10.2.

EXAMPLE 7

There were mixed together in the manner of Example 5 118.0 parts azelaic acid, 223 parts methylene dianiline, 25.8 parts Curithane 103, and 13.3 parts cresylic acid. The contents were heated at 250° C. with the temperature being maintained for one hour with the theoretical amount of water being collected. The solution was then diluted with 1200 parts cresylic acid and 303 pars Solvesso 100, the solution being cooled to room temperature and 100 parts BTDA and 125 parts Mondur SH, a polyisocyanate, added. To a 500-part by weight portion of the above, there were added 14.7 parts maleic anhydride with heating to 70° C. When the materials with and without the maleic anhydride were applied to copper wire as above, the cut-through of the material without maleic anhydride was about 290° C. and that with about 355° C., the respective dielectric strengths being 10 kv. per mil and 7.5 kv. per mil. The 260° C. one-half hour heat shock with elongation of 20 percent were respectively 25%+2× and 25%+5×.

EXAMPLE 8

There were mixed together in the manner of Example 1 190 parts methylene dianiline, 49.4 parts Curithane 103, 150.4 parts azelaic acid, the temperature being raised to 250° C. and maintained for one hour until theoretical water was collected. There were then added to the solution 1539 parts cresylic acid and 385 parts Solvesso 100.

There were then added at room temperature with stirring 96.6 parts BTDA and 19.6 parts maleic anhydride. When applied to a copper wire as above, the flexibility was 25%+2×, the cut-through about 350° C., the dielectric strength 7.3 kv. per mil, and the 260° C., one-half hour, 20% heat shock was 4×. The film build was 2.7 mils.

EXAMPLE 9

A three-liter flask equipped with a stirrer, Dean-Stark trap, condenser, thermometer with a nitrogen inlet was charged with 222.2 parts methylene dianiline, 25.6 parts Curithane 103, 125.8 parts sebacic acid, 100 parts cresylic acid and 30 parts Solvesso 100 as azeotrope solvent. The mixture was stirred and heated to 250° C. until 21.5 parts of water were collected (theoretical 22 parts), then heated an additional hour at 250° C. It was then cooled by addition of 1505 parts cresylic acid and 401 parts Solvesso 100. At 70° C., 150 parts benzophenone tetracarboxylic acid dianhydride and 30.6 parts maleic anhydride were added and stirred for 5 hours. A film was cast in an aluminum cup and cured for one hour at 200° C. A flexible film resulted.

EXAMPLE 10

A flask was charged with 12.9 parts Curithane 103, 59.0 parts azelaic acid, 111.9 parts methylene dianiline, 6.5 parts cresylic acid and 20.0 parts Solvesso 100. The contents were heated to 250° C. under nitrogen, and that temperature maintained for one hour until the theoretical amount of water was collected. At the end of one hour the solution was cut with 600 parts of cresylic acid and 152.0 parts Solvesso 100. To the room temperature solution were added 113.5 parts of Polyhydride 230, a reaction product of trimellitic anhydride and triacetin, and 15.3 parts maleic anhydride. The contents were heated to 70° C. for one hour and then cooled and filtered. A 2.9 mil film was applied to copper wire as above. The cut-through was 215° C., the 260° C., one-half hour, 20% heat shock was 4×, and the flexibility was 25%+1×.

EXAMPLE 11

There were mixed together in the manner of Example 1 190 parts methylene dianiline, 49.4 parts Curithane 103, 120.3 parts azelaic acid and 26.6 parts isophthalic acid along with 20 parts Solvesso 100 solvent. The temperature was raised to 250° C. for about one hour to remove theoretical water. The solution was then diluted with 1540 parts cresylic acid and 385 parts Solvesso 100. Then, at room temperature, there were added with stirring 96.6 parts BTDA and 19.6 parts maleic anhydride. A film cast on aluminum and cured for 20 minutes at 240° C. was bent 180° without cracking or other failure.

EXAMPLE 12

Example 11 was repeated except that 26.6 parts of tetraphthalic acid were used in lieu of the isophthalic acid. A film prepared from this material and cured in the same manner as in Example 13 took a 180° bend without cracking.

EXAMPLE 13

There were mixed together in the manner of Example 8 213.8 parts methylene dianiline, 24.7 parts Curithane 103 and 150.5 parts azelaic acid, the contents being heated to 250° C. for one hour to remove theoretical water. The resulting material was diluted with 1539 parts of a 45 percent phenol-55 percent cresylic acid mixture and 384 parts Solvesso 100. There were added at 60° C. 96.6 parts BTDA with stirring for 20 minutes at which point 19.6 parts maleic anhydride were added with further stirring for about two hours. When coated to a thickness of 2.7 mils on copper wire as above, the flexibility was 25%+1×, the 260° C., 30 minute, 20 percent heat shock was 4×, the dielectric strength was 7.5 kv per mil, and the cut-through was about 370° C.

Examples 14 through Example 23 below represent variations on a composition of the present invention prepared in the manner of Example 1 using 0.2 equivalent of Curithane 103, 1.8 equivalents methylene dianiline, one equivalent of azelatic acid, 0.75 equivalent BTDA, and .25 equivalent of maleic anhydride, this basic composition being known as Composition A.

EXAMPLE 14

Composition A was modified by using one equivalent of BTDA and no maleic anhydride.

EXAMPLE 15

Composition A was modified by using .25 equvalent of Nadic anhydride in lieu of the maleic anhydride.

EXAMPLE 16

There were used .6 equivalent Curithane 103 and 1.4 equivalents of methylene dianiline.

EXAMPLE 17

There were used .2 equivalent isophthalic acid and .8 equivalent azelaic acid.

EXAMPLE 18

There were used .8 equivalent Curithane 103 and 1.2 equivalents methylene dianiline.

EXAMPLE 19

There were used .3 equivalent of isophthalic acid and .7 equivalent of azelaic acid.

EXAMPLE 20

There were used 1.2 equivalents of Curithane 103, .8 equivalent methylene dianiline, .5 equivalent BTDA, and .5 equivalent maleic anhydride.

EXAMPLE 21

There were used 1.6 equivalents Curithane 103, .4 equivalent methylene dianiline, .5 equivalent BTDA and .5 equivalent maleic anhydride.

EXAMPLE 22

There were utilized 1.2 equivalents of Curithane 103, .8 equivalent methylene dianiline, .66 equivalent BTDA, and .33 equivalent maleic anhydride.

The cured film of Examples 14 through 22 had cut-throughs as shown in the table below:

TABLE I

| Example | Percent solids | Viscosity | Cut-through (° C.) |
| --- | --- | --- | --- |
| 14 | 20.0 | 6,430 | 310-310 |
| 15 | 24.1 | 978 | 375-385 |
| | | | 360-365 |
| 16 | 25.0 | 2,270 | 330-370 |
| | | | 380-385 |
| | | | 370-390 |
| 17 | 25.0 | 2,700 | 395-430 |
| 18 | 24.4 | 2,500 | 380-390 |
| 19 | 25.4 | 5,060 | 355-390 |
| 20 | 24.0 | 566 | 405-425 |
| 21 | 23.6 | 931 | 395-410 |
| 22 | 24.3 | 2,270 | 430-440 |

EXAMPLE 23

A flask, under $N_2$, was charged with 25.8 g. of Curithane 103, 223.8 g. of methylene dianiline, 94.0 g. azelaic acid, 24.0 g. of trimellitic anhydride, 13.2 g. of 6191 and 0.5 g. of triphenylphosphite. The contents were stirred and heated to 225° C. for approximately one hour until the approximate theoretical water was collected. To this were added 1199 g. 6191 followed by 303.1 g. Solvesso 100. The contents were then cooled to ≈60° C. and 151.3 g. BTDA added followed by 30.7 g. maleic anhydride twenty minutes later. A film cast on an aluminum cup and cured twenty minutes at 200° C. was clear, tough and flexible.

EXAMPLE 24

A flask, under $N_2$, was charged with 213.8 g. methylene dianiline, 24.7 g. Curithane 103, 150.4 g. azelaic acid, and the contents heated to 250° C. with the theoretical amount of water collected while the temperature was maintained for one hour at 250° C. To the flask were added 1539 g. of 6191 and followed by 384 g. of Solvesso 100. The contents were then cooled to 60° C. and 96.6 g. of benzophenone tetracarboxylic dianhydride were added; after stirring for twenty minutes, 19.6 g. maleic anhydride were added.

When applied to 0.0403" copper wire, the following results were obtained.

Heat shock, 20%, 260° C., ½ hour _____ 25%+2×
Cut through _____ 350–385
Heat shock, 20%, 260° C., ½ hour _____ 4×

EXAMPLE 25

There were mixed together 4720 g. azelaic acid, 1032 g. Curithane 103, 8952 g. methylene dianiline, 530 g. cresylic acid (6193), and 175 g. of Solvesso 100. The mixture was heated as rapidly as possible to 250° C., collecting the water as it was azeotroped off. A total of 852 g. water was collected (theoretical 903 g.). After one and one-half hours at 250° C., 6000 g. of cresylic acid were added to the above solution and then the solution was drained into a can containing 41,966 g. of cresylic acid. To this stirred solution were added 12,125 g. of Solvesso 100. This mixture was then cooled to 50° C. and 6053 g. of BTDA were added. After fifteen minutes, 300 g. of maleic anhydride were added and the mixture was heated to 70° C. One hour later 925 g. of maleic anhydride were added, the heat turned off, and the solution allowed to stir overnight. It was then filtered and had a solids content of 25.2 percent and a viscosity of 1640 centipoises at 25° C. This provided a good coating material.

There are provided by the present invention new and useful polyamideimide coating compositions which are noted by their versatility. When coated on 0.0403" diameter copper wire, for example, a 2.8 mil build can be attained in six passes instead of the eight passes normally used for these types of materials. The cured coating has a high cut-through while maintaining good flexibility and heat shock. Flexibility retention for the present material typically after 100 hours at 150° C. and 20% elongation is 3×, no change in flexibility being apparent after 20 weeks at ambient temperature. The present materials are very readily coated on aluminum wire. For instance, when the material of Example 25 was coated on 0.0403" diameter aluminum wire to a build of 2.9 mils in six passes, the heat shock at 260° C. and 20% stretch was 2× and the dielectric strength was 13.5 kv. per mil. Flexibility retention after 20 weeks at ambient temperature was 25% plus 1×. When heat aged for 100 hours at 150° C., the flexibility at zero stretch was 1× and at 20% stretch the flexibility was 3×. The materials of the present invention are likewise readily coated on rectangular wire giving good corner coverage and superior adhesion. When the present materials were coated over a 160 mil by 590 mil rectangular aluminum bar, the adhesion measured by twist tests was three to ten times better than a typical prior art polyamideimide material.

The present materials are not only useful as base coats but give superior insulating qualities when used as overcoats over other types of wire enamels. Shown in Table II below are the characteristics of the coating material of the present invention when coated over a polyester material as compared to other typical polyamideimide coating materials A and B. All polyester base coats were applied to 0.0403" diameter copper wire with four passes for the base coat to a thickness of 2 mils and two passes for the overcoat for an additional thickness of 1 mil.

TABLE II

| Sample | Present invention | A | B |
| --- | --- | --- | --- |
| Flexibility, 25+ —X | 2 | 2 | 2 |
| Heat shock ½ hr., 220° C., 20% | 2 | 3 | 1 |
| Dissipation factor, 220° C | 16.6 | 18.2 | 48.2 |
| Cut-through, ° C | 380 | 360 | 370 |
| Abrasion: | | | |
| Single | +2,880 | 2,700 | 2,675 |
| Repeat | 87 | 108 | 158 |
| Dielectric kv | 9.0 | 7.6 | 8.0 |
| NMP, 5 min. 70° C | OK | OK | OK |

It will be noted from the above Table II that the cut-through and the heat shock afforded by the present materials are particularly significant along with other desirable characteristics.

Shown in Table III below is a comparison of the coating composition of the present invention with coatings of typical polyamideimides C and D, all prepared to a thickness of 3 mils on 0.0403" diameter copper wire.

TABLE III

| Sample | Present invention | C | D |
| --- | --- | --- | --- |
| Flexibility, 25+ —X | 2 | 1 | 1 |
| Heat shock, ½ hr., 220° C., 20% | 2 | 3 | 3 |
| Dissipation factor, 220° C | 8.7 | 10.6 | 14.7 |
| Cut-through, ° C | 400 | 365 | 355 |
| Abrasion: | | | |
| Single | +3,000 | +3,000 | +3,000 |
| Repeat | 183 | 189 | 197 |
| Dielectric, kv | 9.1 | 8.9 | 11.2 |

Again, it will be noted that the cut-through and the heat shock resistance of the present materials are particularly good in comparison with the other materials.

Shown in Table IV below is a comparison of the present material overcoated over polyesteramideimide as compared to typical other polyamideimides E and F overcoated in the same manner, again the heat shock and cut-through of the present materials being superior and in connection with the other characteristics shown providing a superior balanced coating material. Polyamideimides A, C and E used for comparison are the same material. Similarly, polyamideimides B, D and F are the same.

TABLE IV

| Sample | Present invention | E | F |
| --- | --- | --- | --- |
| Flexibility, 25+ —X | 2 | 1 | 1 |
| Heat shock, ½ hr., 220° C., 20% | 2 | 3 | 3 |
| Dissipation factor, 220° C | 8.7 | 10.6 | 14.7 |
| Cut-through, ° C | 400 | 365 | 355 |
| Abrasion: | | | |
| Single | +3,000 | +3,000 | +3,000 |
| Repeat | 183 | 189 | 197 |
| Dielectric, kv | 9.1 | 8.9 | 11.2 |

The present materials are also useful in overcoating polyesterimide base coats. Typical results of such overcoating to a thickness of 1 mil over a base coat of 2 mils are shown in Table V below.

TABLE V

| Sample | Present invention |
| --- | --- |
| Build | 3.1 |
| Dissipation factor, 220° C. | 9.5 |
| Flexibility, 25+ — × | 1 –1 |
| Heat shock, ½ hr., 240° C., 20% | 1× |
| Cut-through, ° C. | 345 |
| Abrasion: | |
| Single | 3000+ |
| Repeat | 113 |
| Emerson, lbs. | 26P |

The present materials are also notable for their resistance to fluorinated and chlorinated hydrocarbons such as Freon refrigerants.

Shown in Table VI below are data concerning the coating of the present invention as applied to a thickness of 3 mils on a 0.0403" diameter copper wire as compared with other typical coatings as noted. The twisted pairs were soaked in R22 halogenated hydrocarbon for 72 hours, 168 hours, 336 hours, and 504 hours respectively, under 600 p.s.i., at 70° C., the samples being examined at differing temperatures as noted, ranging from about 72° C. to 200° C.

(VII) 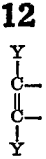

TABLE VI

| Sample | Pre-anneal, hours | Hours soaked | | | | | | | | | | |
|---|---|---|---|---|---|---|---|---|---|---|---|---|
| | | 72 | | | 168 | | | 336 | | | 504 | |
| | | Blister temperature | | | | | | | | | | |
| | | 72° | 100° | 150° | 150° | 180° | 200° | 150° | 180° | 200° | 150° | 180° | 200° |
| Ester | 4 | OK | SB | XB | | | | | | | | | |
| Amide-imide | 1 | OK | SB | XB | | | | | | | | | |
| Esterimide | 4 | OK | OK | XB | | | | | | | | | |
| Esterimide | 1 | OK | OK | XB | | | | | | | | | |
| Esterimide | 4 | OK | OK | OK | SB | B | XB | SB | XB | XB | B | XB | XB |
| Amide-imide | 1 | OK | OK | SB | | | | | | | | | |
| Esteramideimide | 4 | OK | OK | OK | XB | B | SB | B | XB | XB | B | XB | XB |
| Amide-imide | 1 | OK | OK | SB | | | | | | | | | |
| Present invention | 4 | OK | OK | OK | OK | SB | SB | OK | SB | SB | OK | SB | SB |
| | 1 | OK | OK | OK | | | | | | | | | |
| Do | 4 | OK | OK | OK | OK | OK | OK | OK | OK | SB | OK | OK | SB |
| (Nylon overcoat) | 1 | OK | OK | OK | | | | | | | | | |

Note.—SB=Slight blistering; B=Blistering; XB=Excessive blistering. Aging condition: 600 p.s.i., 70° C., R-22 atmosphere. Test specimen, twisted pairs.

It will be noted that after 504 hours, the present materials were still blister-free while the ester and ester-amide-imide overcoated materials were blistered excessively after only 72 hours and 336 hours respectively.

There are provided, then, by the present invention new and useful polyamide imides and their precursor polyamic acids. The polyamic acids are not only prepared in relatively economic and widely available solvents, but such materials are also readily applied to base coats such as electrical conductors at high speeds to provide final cured coatings which are particularly useful for high temperature applications while at the same time being possessed of good and lasting flexibility, desirable cut-through, abrasion resistance and dissipation factor as well as resistance to halogenated hydrocarbon as in hermetic applications. The materials are also useful as adhesives and for laminating purposes. The powdered material can be used for molding purposes.

What we claim as new and desire to secure by Letters Patent of the United States is:

1. The polymeric acid product of reaction of (I) the reaction product of (a) aliphatic diacid having from about 1 to 40 carbon atoms with (b) polyamine material having at least two amino groups comprising polyamine having the formula (IV) 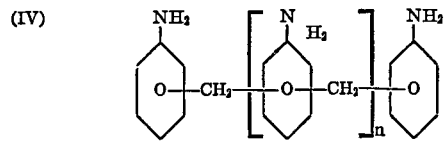

where $n$ is at least about 0.1 and (II) organic dianhydride and aliphatically unsaturated organic anhydride having the formula (VI) 

where R'''' is an aliphatically unsaturated divalent organic radical selected from (VIII) 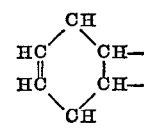

(IX) 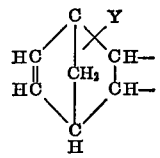

where Y is a radical selected from hydrogen, lower alkyl, halogen, and mixtures thereof, said polyamine of Formula IV being at least ten equivalent percent of the polyamine material.

2. A product as in claim 1 wherein said aliphatic diacid comprises azelaic acid, said polyamide material also includes methylene dianiline, said organic dianhydride comprises benzophenone dianhydride and said aliphatically unsaturated organic anhydride comprises maleic anhydride.

3. A product as in claim 1 in which a portion of the aliphatic diacid is substituted with material selected from aromatic acid and anhydride and mixtures thereof containing at least two groups selected from carboxyl and anhydride groups and aliphatic anhydride.

4. A coating composition comprising the product of claim 1 in a compatible solvent.

5. A substrate coated with the cured product of claim 1.

6. A product as in claim 3 wherein said aromatic anhydride is trimellitic anhydride.

7. The polyamideimide cured product of claim 1.

References Cited

UNITED STATES PATENTS

| 3,575,924 | 4/1971 | Lyon | 260—47 |
| 3,576,691 | 4/1971 | Meyers | 156—309 |
| 3,652,511 | 3/1972 | Vincent et al. | 260—78 |
| 3,714,131 | 1/1973 | Hoback et al. | 260—78 TF |

LESTER L. LEE, Primary Examiner

U.S. Cl. X.R.

117—72, 75, 132 B, 161 P; 260—32.6 M, 32.8 M, 33.4 P, 47 CP, 65, 78 UA, 78 TF

UNITED STATES PATENT OFFICE
CERTIFICATE OF CORRECTION

Patent No. 3,778,411                    Dated December 11, 1973

Inventor(s) Carl M. Emerick et al.

It is certified that error appears in the above-identified patent and that said Letters Patent are hereby corrected as shown below:

Claim 1, formula (IV) correct the spacing (2nd occurrence) of "N$H_2$" to -- $NH_2$ --.

Claim 1, formula (VI) change "R'''" to -- R"" --.

Claim 2, line 2, change "polyamide" to -- polyamine --.

Signed and sealed this 30th day of April 1974.

(SEAL)
Attest:

EDWARD M. FLETCHER, JR.              C. MARSHALL DANN
Attesting Officer                    Commissioner of Patents